(12) United States Patent
Cocchi et al.

(10) Patent No.: US 11,484,042 B2
(45) Date of Patent: Nov. 1, 2022

(54) MACHINE FOR MAKING LIQUID OR SEMI-LIQUID FOOD PRODUCTS

(71) Applicant: ALI GROUP S.R.L. - CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernusco sul Naviglio (IT)

( * ) Notice: Subject to any disclaimer, the term of this patent is extended or adjusted under 35 U.S.C. 154(b) by 245 days.

(21) Appl. No.: 16/710,824

(22) Filed: Dec. 11, 2019

(65) Prior Publication Data

US 2020/0196626 A1  Jun. 25, 2020

(30) Foreign Application Priority Data

Dec. 20, 2018  (IT) .................... IT202018000005095

(51) Int. Cl.
*A23G 9/12*  (2006.01)

(52) U.S. Cl.
CPC ..................... *A23G 9/12* (2013.01)

(58) Field of Classification Search
CPC . A23G 9/12; A23G 9/08; A23G 9/086; A23G 9/103; A23G 9/106; A23G 9/16; A23G 9/163; A23G 9/166; A23G 9/222
See application file for complete search history.

(56) References Cited

U.S. PATENT DOCUMENTS

| | | | | |
|---|---|---|---|---|
| 1,841,762 A | * | 1/1932 | Samesreuther et al. | F17C 1/08 165/169 |
| 2,263,794 A | * | 11/1941 | Wyen | A23C 3/045 62/213 |
| 2,266,766 A | * | 12/1941 | Knight | A23G 9/12 62/258 |
| 2,432,042 A | * | 12/1947 | Richard | F25D 11/04 62/273 |
| 3,120,869 A | * | 2/1964 | Carpenter | F22B 37/102 165/171 |
| 3,465,540 A | * | 9/1969 | Carpigiani | A23G 9/12 62/343 |
| 4,144,875 A | * | 3/1979 | Bruno | F24S 10/753 126/662 |
| 4,185,369 A | * | 1/1980 | Darrow | B23P 15/04 228/183 |
| 4,538,427 A | * | 9/1985 | Cavalli | F25D 11/00 62/342 |

(Continued)

FOREIGN PATENT DOCUMENTS

CN  112055539 A * 12/2020 ............... A23G 9/08

*Primary Examiner* — Miguel A Diaz
(74) *Attorney, Agent, or Firm* — Shuttleworth & Ingersoll, PLC; Timothy Klima

(57) ABSTRACT

A machine for making liquid or semi-liquid food products includes: a first processing container for processing a liquid or semi-liquid base product and defining a processing chamber; a stirrer for mixing the product in the first processing container; a thermal system including a heat exchanger, associated with the first processing container, wherein the heat exchanger includes a hollow element extending along an axis and provided externally with grooves defining a path extending along the axis and at least one duct disposed inside the grooves.

5 Claims, 3 Drawing Sheets

(56) References Cited

U.S. PATENT DOCUMENTS

| | | | | |
|---|---|---|---|---|
| 4,573,329 A * | 3/1986 | Cavalli | | F25D 31/006 62/342 |
| 4,655,605 A * | 4/1987 | Cipelletti | | B01F 7/001 366/149 |
| 4,739,630 A * | 4/1988 | Tandeski | | F25C 1/147 165/169 |
| 5,729,988 A * | 3/1998 | Tchernev | | F28D 20/003 62/106 |
| 5,927,098 A * | 7/1999 | Lee | | A23G 9/12 62/342 |
| 6,619,067 B2 * | 9/2003 | Hiramatsu | | F25C 1/147 165/133 |
| 8,721,982 B2 * | 5/2014 | Yamazumi | | F28D 1/06 422/202 |
| 8,746,004 B2 * | 6/2014 | Jejcic | | B01F 7/162 62/342 |
| 9,462,826 B2 * | 10/2016 | Cocchi | | A23G 9/045 |
| 9,993,015 B2 * | 6/2018 | Geng | | A23G 9/224 |
| 2002/0184910 A1 * | 12/2002 | Hiramatsu | | F28F 13/00 62/354 |
| 2010/0175390 A1 * | 7/2010 | Jejcic | | A23G 9/228 62/1 |
| 2012/0104046 A1 * | 5/2012 | Wadle | | A23G 9/28 62/342 |
| 2013/0269381 A1 * | 10/2013 | Cocchi | | A23G 9/222 62/246 |
| 2016/0366906 A1 * | 12/2016 | Geng | | B01F 15/065 |
| 2017/0284712 A1 * | 10/2017 | Ugajin | | F25B 9/006 |
| 2018/0263256 A1 * | 9/2018 | De' Longhi | | A23G 9/22 |
| 2018/0279645 A1 * | 10/2018 | Cocchi | | F28D 7/0075 |
| 2019/0053514 A1 * | 2/2019 | Fonte | | B65D 85/8046 |
| 2020/0056814 A1 * | 2/2020 | Fonte | | A23G 9/106 |
| 2021/0195915 A1 * | 7/2021 | Bellomare | | A23G 9/281 |
| 2021/0204564 A1 * | 7/2021 | Bellomare | | A23G 9/281 |
| 2021/0278112 A1 * | 9/2021 | Jeong | | F25B 39/00 |

* cited by examiner

MACHINE FOR MAKING LIQUID OR SEMI-LIQUID FOOD PRODUCTS

This application claims priority to Italian Patent Application IT 202018000005095 filed Dec. 20, 2018, the entirety of which is incorporated by reference herein.

BACKGROUND OF THE INVENTION

This invention relates to a machine for making liquid or semi-liquid food products.

A need felt particularly strongly by users is that for a machine for making liquid or semi-liquid products whose heat exchanger is particularly simple to construct, efficient and inexpensive.

Another need felt particularly strongly by users is that for a machine for making liquid or semi-liquid products whose heat exchanger can operate at the high pressures the heat exchanger fluid is subjected to and which is also particularly reliable.

SUMMARY OF THE INVENTION

This invention therefore has for an aim to meet the above mentioned need, specifically to provide a machine whose features make it easy to construct and energy efficient.

Another aim of this invention is to provide a machine whose features allow it to be equipped with a heat exchanger that is particularly robust, in particular at the high pressures of the heat exchanger fluid operating inside it.

BRIEF DESCRIPTION OF THE DRAWINGS

The technical features of the invention, with reference to the above aims, are clearly described in the annexed claims and its advantages are more apparent from the detailed description which follows, with reference to the accompanying drawings which illustrate an example, non-limiting embodiment of the invention and in which:

DESCRIPTION OF THE PREFERRED EMBODIMENTS

Figure 1:
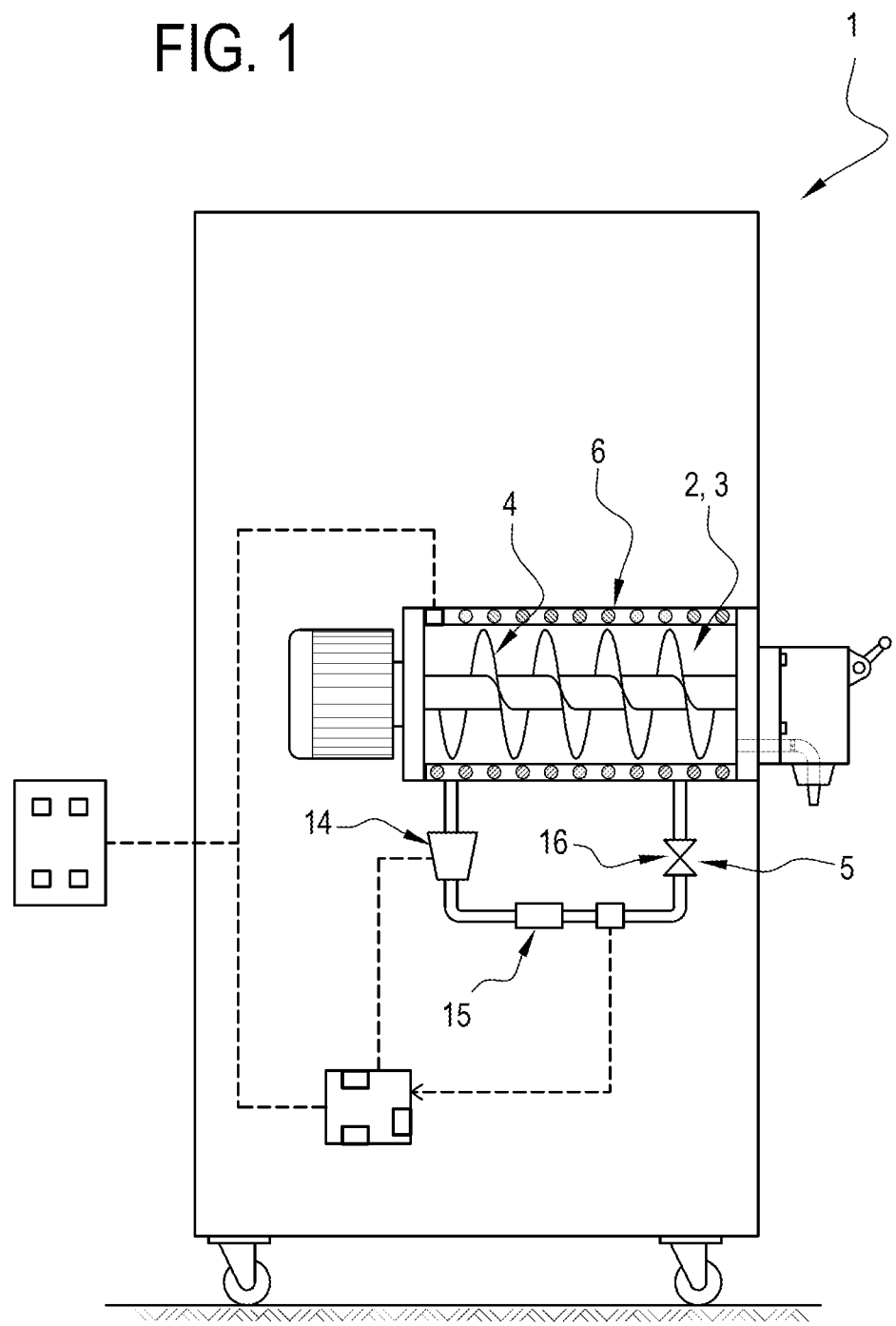
FIG. 1 is a schematic view of a first embodiment of a machine according to this invention.

According to the accompanying drawings, the numeral 1 denotes a machine for making liquid or semi-liquid food products according to the invention.

The machine 1 is preferably designed to make products for the ice cream, bakery and confectionery and related trades (such as, by way of non-limiting example, gelato, soft ice cream, granitas, sorbets, milk shakes, yogurts, frozen desserts, chilled dessert creams).

The machine 1 for making liquid or semi-liquid food products comprises:

a first processing container 2 for processing a liquid or semi-liquid base product and defining a processing chamber 3;

a stirrer 4 (preferably positioned inside the first container 2) for mixing the product contained in the first processing container 2;

a thermal system 5 comprising a heat exchanger 6, associated with the first processing container 2.

According to the disclosure, the heat exchanger 6 comprises a hollow element 8 extending along an axis A and provided externally with grooves (hollows) 7 defining a path extending (preferably helically) along the axis A and at least one duct 9 disposed inside the grooves 7.

Figure 2:
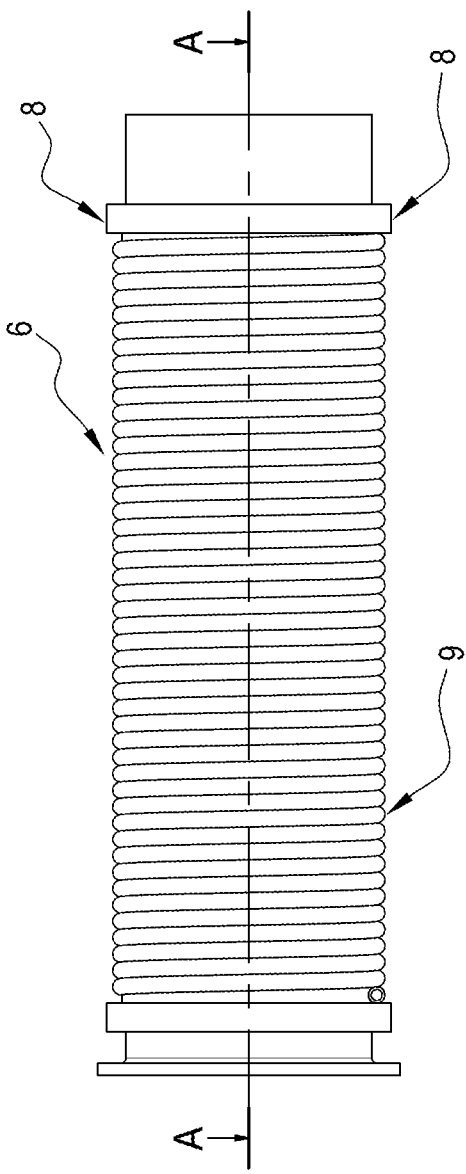
FIGS. 2 and 3 illustrate respective schematic views of an exchanger in the machine of FIG. 1.
Figure 3:
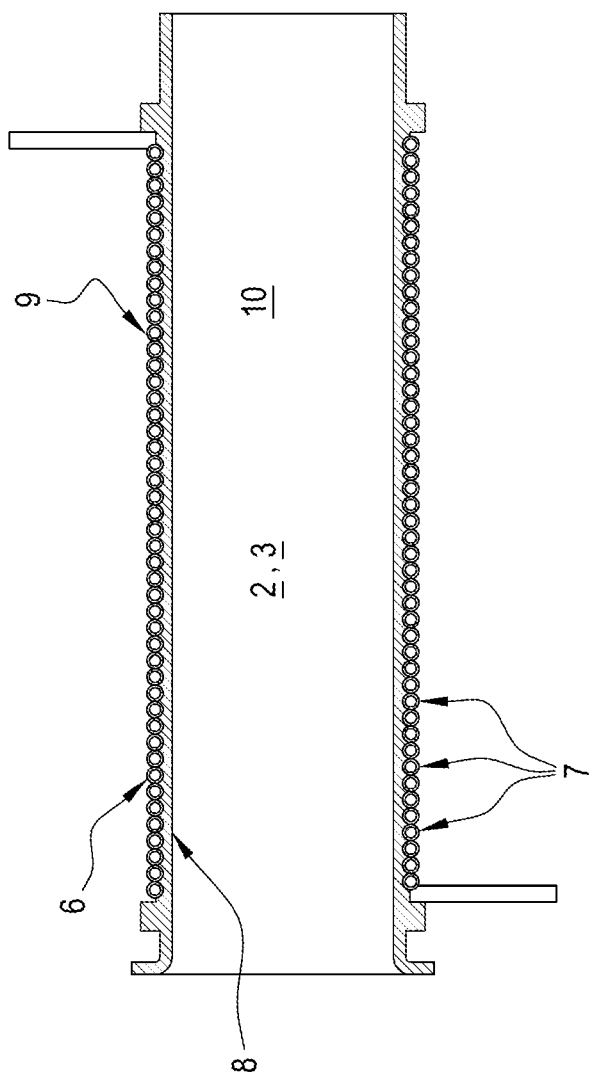
Figure 4:
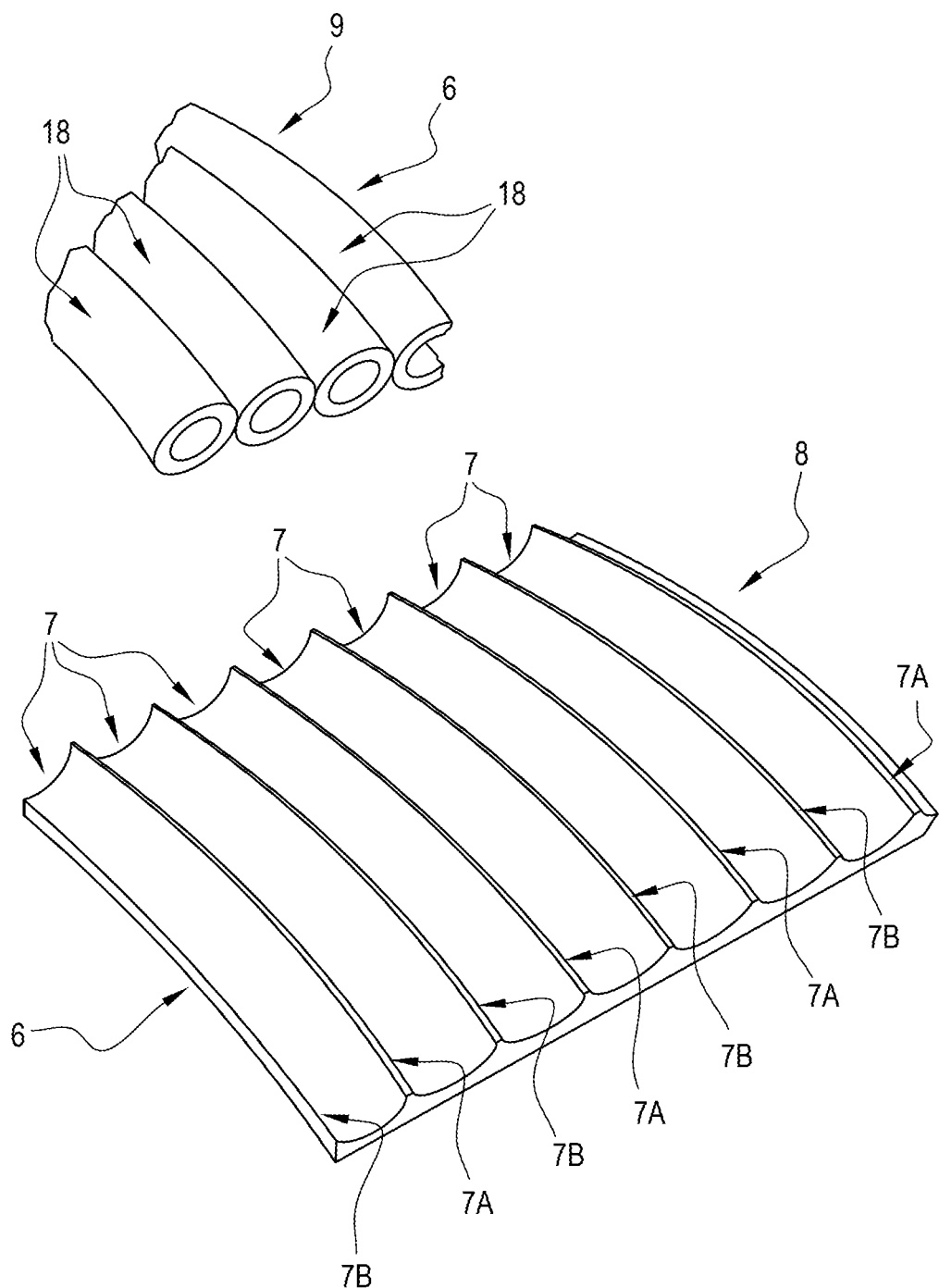
FIG. 4 shows a perspective view of a detail from FIGS. 2 and 3.

It should be noted that FIG. 1 schematically illustrates the exchanger 6 forming part of the machine 1 of this invention: the exchanger 6 is better illustrated in FIGS. 2-4.

Preferably the hollow element 8 is provided with a cavity 10 that defines the first processing container 2.

According to another aspect, the thermal system 5 further comprises a compressor 14, a pressure reducing valve 15 and a further heat exchanger 16.

The thermal system 5 is, preferably, a thermodynamic system.

It should be noted, therefore, that the thermal system 5 comprises a closed circuit (including the exchanger 6, the compressor 14, a pressure reducing valve 15 and a further exchanger 16) in which a heat exchanger fluid circulates to run a thermodynamic cycle.

According to another aspect, the at least one duct 9 disposed inside the grooves 7 is a suitably bent, hollow pipe.

Preferably, the at least one duct 9 disposed inside the grooves 7 is a hollow, metal pipe.

Preferably, the at least one duct 9 disposed inside the grooves 7 is a pipe made of copper or aluminum or steel.

According to another aspect, the adjacent branches of the pipe disposed in the grooves 7 are connected by a brazed seam 18.

As illustrated in FIG. 4 (which shows two pieces of the duct 9 and the hollow element 8), the brazed seam joins the outside walls of the pipe.

Preferably, the duct 9 has a substantially circular cross section.

Preferably, the duct 9 has an internal diameter of between 2 and 12 mm.

Preferably, the duct 9 has a wall thickness of between 0.5 and 2 mm.

Preferably, the grooves 7 have a substantially curved shape.

Each groove extends across a pair of crests (7A, 7B).

The exchanger 6 can operate at high pressures of the heat exchanger fluid and is particularly robust.

In effect, thanks to the hollows 7 and the special arrangement of the duct 9 and its fastening by brazing, the exchanger 6 is capable of functioning even at particularly high pressures of the heat exchanger fluid, such as, for example, the operating pressures of $CO_2$ systems.

The machine 1 is therefore particularly robust, reliable, simple and, as whole, easy to construct.

What is claimed is:

1. A machine for making liquid or semi-liquid food products, comprising:

a first processing container for processing a liquid or semi-liquid base product, the first processing container including a hollow element having a cavity defining a first processing chamber of the first processing container;

a stirrer positioned in the first processing chamber for mixing the liquid or semi-liquid base product in the first processing chamber;

a thermal system comprising:
the hollow element;
a heat exchanger, thermally connected to the hollow element;
wherein the hollow element extends along an axis and includes at least one groove formed in an external surface of the hollow element, the at least one groove having a substantially curved shape extending between an adjacent pair of crests and defining a helical path extending around and along the axis to surround the hollow element; and at least one duct disposed inside the at least one groove;

wherein the at least one duct is defined by a pipe having adjacent branches, wherein the adjacent branches are connected by a brazed seam;

wherein the pipe is a hollow pipe made of copper, aluminum or steel, with an internal diameter of between 2 and 12 mm, and has a helical configuration to be positioned in and conform to the helical path of the at least one groove.

2. The machine according to claim 1, wherein the thermal system further comprises a compressor, a pressure reducing valve and a further heat exchanger.

3. The machine according to claim 1, wherein the pipe has a wall thickness of between 0.5 and 2 mm.

4. The machine according to claim 1, wherein the pipe is a bent pipe.

5. The machine according to claim 4, wherein the pipe has a substantially circular cross section.

\* \* \* \* \*